(12) United States Patent
Katoh

(10) Patent No.: US 10,879,558 B2
(45) Date of Patent: Dec. 29, 2020

(54) MATERIALS FOR SOLID ELECTROLYTE

(71) Applicant: TOYOTA MOTOR EUROPE, Brussels (BE)

(72) Inventor: Yuki Katoh, Brussels (BE)

(73) Assignee: Toyota Motor Europe, Brussels (BE)

( * ) Notice: Subject to any disclaimer, the term of this patent is extended or adjusted under 35 U.S.C. 154(b) by 138 days.

(21) Appl. No.: 16/060,176

(22) PCT Filed: Dec. 22, 2015

(86) PCT No.: PCT/EP2015/081019
§ 371 (c)(1),
(2) Date: Jun. 7, 2018

(87) PCT Pub. No.: WO2017/108105
PCT Pub. Date: Jun. 29, 2017

(65) Prior Publication Data
US 2018/0366779 A1    Dec. 20, 2018

(51) Int. Cl.
| | | |
|---|---|---|
| *H01M 10/0562* | (2010.01) | |
| *H01B 1/10* | (2006.01) | |
| *H01M 10/0525* | (2010.01) | |
| *C01B 25/14* | (2006.01) | |
| *C01G 17/00* | (2006.01) | |
| *C01G 19/00* | (2006.01) | |
| *C01D 15/00* | (2006.01) | |

(52) U.S. Cl.
CPC ......... *H01M 10/0562* (2013.01); *C01B 25/14* (2013.01); *C01G 17/006* (2013.01); *C01G 19/006* (2013.01); *H01B 1/10* (2013.01); *H01M 10/0525* (2013.01); *C01D 15/00* (2013.01); *H01M 2300/008* (2013.01); *H01M 2300/0068* (2013.01)

(58) Field of Classification Search
None
See application file for complete search history.

(56) References Cited

U.S. PATENT DOCUMENTS

| | | |
|---|---|---|
| 6,066,417 A | 5/2000 | Cho et al. |
| 2009/0087751 A1 | 4/2009 | Kondo et al. |
| 2014/0178768 A1 | 6/2014 | Uchiyama et al. |
| 2015/0333367 A1 | 11/2015 | Kato et al. |
| 2015/0333368 A1 | 11/2015 | Kato et al. |

FOREIGN PATENT DOCUMENTS

| | | |
|---|---|---|
| CN | 105098230 A | 11/2015 |
| DE | 19825807 A1 | 12/1998 |
| JP | 2013026003 A | 2/2013 |
| JP | 2015220013 A | 12/2015 |

(Continued)

OTHER PUBLICATIONS

Rao Rayavarapu et al., Variation in structure and Li+-ion migration in argyrodite-type Li6PS5X (X = Cl, Br, I) solid electrolytes, J. Solid State Electrchem, (2012) vol. 16, pp. 1807-1813.

(Continued)

*Primary Examiner* — Wyatt P McConnell
(74) *Attorney, Agent, or Firm* — Dinsmore & Shohl LLP

(57) ABSTRACT

The present disclosure relates to a material containing the elements Li, M, P, S and X wherein M=Si, Ge or Sn, and X=F, Cl, Br or I. The material can be used as a sulfide solid electrolyte material, notably for an all-solid-state lithium battery.

20 Claims, 2 Drawing Sheets

(56) References Cited

FOREIGN PATENT DOCUMENTS

| JP | 2015220015 A | 12/2015 |
| WO | 2013099834 A1 | 7/2013 |
| WO | 2015001818 A1 | 1/2015 |

OTHER PUBLICATIONS

Boulineau et al., "Mechanochemical synthesis of Li-argyrodite $Li_6PS_5X$ (X=Cl, Br, I) as sulfur-based solid electrolytes for all solid state batteries application," Solid State Ionics 221, (2012), pp. 1-5.

MATERIALS FOR SOLID ELECTROLYTE

CROSS-REFERENCE TO RELATED APPLICATIONS

The present application is the National Phase entry of International Patent Application No. PCT/EP2015/081019 filed on Dec. 22, 2015, the entire contents of which are hereby incorporated by reference into this application.

TECHNICAL FIELD

The present disclosure relates to a material containing the elements Li, M, P, S and X wherein M=Si, Ge or Sn, and X=F, Cl, Br or I. The material can be used as a sulfide solid electrolyte material, notably for an all-solid-state lithium battery.

BACKGROUND ART

The solidification of the electrolyte provides an advantage for use in battery applications. In the case of the all-solid-battery system, the non-liquid nature of the electrolyte allows stacking of the battery cells in a single package without an ionic short circuit. Such a battery configuration decreases the dead-space between the single cells. In addition, this structure is suitable for applications requiring a high voltage and limited space, such as vehicle power sources.

In the basic structure of an exemplary all-solid-state battery the following layers are arranged in order: cathode current collector, cathode, solid electrolyte, anode, anode current collector. Further layers may be present—for example, a buffer layer may also be interposed at the cathode/solid electrolyte interface in order to enhance lithium-ion transfer at the interface.

As representative examples of known cathode active materials for lithium all-solid-state batteries, $LiCoO_2$ and $LiFePO_4$ may be cited. The negative electrode active material may be, for example, a carbon active material or a metal/alloy-based active material.

Concerning the solid-state electrolyte, a certain number of oxide-based or sulfide-based materials are known. Oxide-based solid electrolyte materials for lithium all-solid-state batteries typically contain Li and O, and often also a transition metal and/or metal/metalloid from group 13/14 of the Periodic Table (e.g. Al, Si, Ge), and/or phosphorus. Known materials in this context include LiPON (for example, $Li_{2.9}PO_{3.3}N_{0.46}$), LiLaTiO (for example, $Li_{0.34}La_{0.51}TiO_3$), LiLaZrO (for example, $Li_7La_3Zr_2O_{12}$). Compounds which have a NASICON mold structure can also be mentioned e.g. the compound denoted by general formula $Li_{1+x}Al_xGe_{2-x}(PO_4)_3$ (0≤x≤2), or the compound denoted by general formula $Li_{1+x}Al_xTi_{2-x}(PO_4)_3$ (0≤x≤2). Another possibility is a lithium borosilicate.

Concerning sulfide-based electrolyte materials, known materials include ones containing Li, S, and possibly one or more of P, Si/Ge (also group 13 elements B, Al, Ga, In). Known possibilities include, for example, $Li_{10}GeP_2S_{12}$, $Li_2S$—$P_2S_5$ and $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$ and $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n being positive numbers, Z being Ge, Zn, or Ga), $Li_2S$—$GeS_2$ and $Li_2S$—$SiS_2$—$Li_3PO_4$, and $Li_2S$—$SiS_2$—$Li_xMO_y$, (where x and y are positive numbers, M is P, Si, Ge, B, aluminum, Ga, or In etc.) The description of the above "$Li_2S$—$P_2S_5$" refers to sulfide solid electrolyte materials which use the material composition containing $Li_2S$ and $P_2S_5$ in varying relative amounts, the same naming convention referring to other descriptions hereinabove.

WO 2013/099834 discloses a sulfide-based solid electrolyte with an argyrodite type crystal ($Li_{7-x}Si_xP_{1-x}S_6$). However, here it appears that there is a problem of low ionic conductivity due to the high P content—without wishing to be bound by any particular theory, it is believed that the interaction of $PS_4^{3-}$ and $Li^+$ decreases ionic conductivity.

Similarly, in Rao Rayavarapu et al., *J. Solid State Electrochem.* (2012) 16:1807-1813, the authors investigated an argyrodite type crystal with the composition of $Li_6PS_5X$ (X=Cl, Br, I), and also in Boulineau et al., *Solid State Ionics* 221 (2012) 1-5, the authors investigated an argyrodite type crystal with the composition of $Li_6PS_5X$ (X=Cl, Br, I). In these cases, it is considered that a problem of low ionic conductivity arises for the same reasons as given above.

SUMMARY

The present disclosure has been carried out with a view to solving existing problems in the field of solid electrolyte materials for use in all-solid-battery systems, in particular with a view to providing materials with high ionic conductivity, and consequently higher output for a battery, in particular a lithium battery, containing such solid electrolyte materials.

In one aspect, the present disclosure relates to a material comprising the elements Li, M, P, S and X, wherein M is at least one element selected from the group consisting of: Si, Ge, and Sn; and X is at least one element selected from the group consisting of F, Cl, Br and I.

In another aspect, the present disclosure relates to a process for preparing a material according to the present disclosure comprising the elements Li, M, P, S and X, the process comprising the steps of:

(a) providing the solid sulfides $Li_2S$, $MS_2$ (M=Si, Ge or Sn) and $P_2S_5$, as well as LiX (X=F, Cl, Br, I) as dry powders, in the stoichiometric proportions corresponding to the target product, and mixing the powders;

(b) milling the mixture obtained in step (a) under an inert atmosphere;

(c) heating the milled mixture obtained in step (b) at a temperature T of 300° C.≤T≤700° C., under a pressure P of 0.1 Pa≤P≤200 Pa, for a duration t of 1 h≤t≤50 h.

In another aspect, the present disclosure relates to an all-solid-state lithium battery comprising the following elements:

a positive electrode active material layer;
a solid electrolyte;
a negative electrode active material layer,
wherein the solid electrolyte contains a material of the present disclosure comprising the elements Li, M, P, S and X.

DETAILED DESCRIPTION

Figure 1:
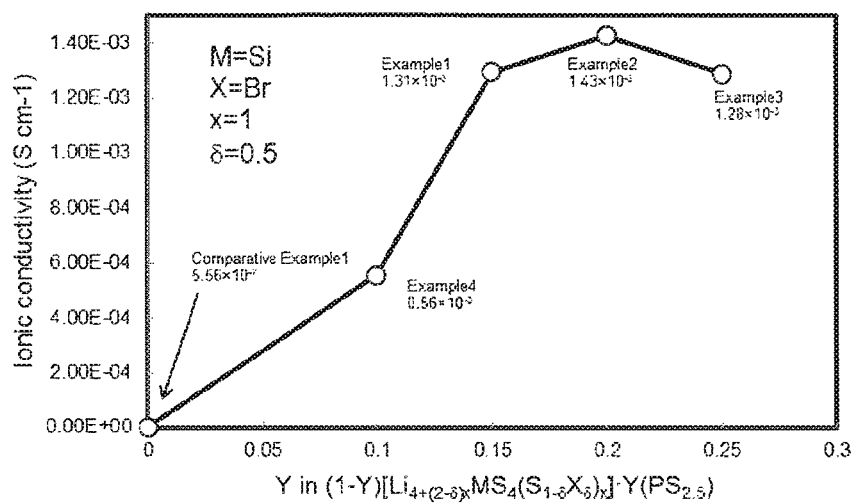
FIG. 1 shows the ionic conductivity of sulfide solid electrolyte materials prepared in the Examples and Comparative Example.

The present disclosure relates, most generally, to a material comprising the elements Li, M, P, S and X, wherein M is at least one element selected from the group consisting of: Si, Ge, and Sn; and X is at least one element selected from the group consisting of F, Cl, Br and I.

Such a material comprising the elements Li, M, P, S and X, can for example, be prepared from: Li precursors including lithium in the elemental state as well as lithium halides LiX (X being as defined above), M precursors (i.e. Si, Ge or Sn precursors) including M (i.e. Si, Ge or Sn) in the elemental state or as sulfides such as $SiS_2$, sulfur (S) precursors including elemental sulfur or sulfides including $Li_2S$, $MS_2$ (e.g. $SiS_2$) and phosphorus sulfides such as $P_2S_5$, and phosphorus (P) precursors including elemental phosphorus, phosphorus sulfides such as $P_2S_5$ and phosphorus halides such as $PBr_5$.

In an exemplary method of preparing a material comprising the elements Li, M, P, S and X according to the present disclosure, a melt quenching method can be applied as well as a ball milling procedure. Thus, in a typical synthesis method, ball milling is used to thoroughly mix solid precursors in a powdery state. Apart from ball milling, vibration milling and jet milling are also possible techniques. After the mixing of starting materials in the appropriate molar ratio, they may be put into a glass tube, the glass tube sealed under vacuum, and the sample heated at a high temperature, typically over 800° C., in order to melt the starting materials, this temperature being kept for 8 h. Then the glass tube may be put into ice water for quenching.

In one method according to the present disclosure, using some appropriate precursors, the process for preparing a material includes the steps of:

(a) providing the solid sulfides $Li_2S$, $MS_2$ (M=Si, Ge or Sn) and $P_2S_5$, as well as LiX (X=F, Cl, Br, I) as dry powders, in the stoichiometric proportions corresponding to the target product, and mixing the powders;

(b) milling the mixture obtained in step (a) under an inert atmosphere;

(c) heating the milled mixture obtained in step (b) at a temperature T of 300° C.≤T≤700° C., or 450° C.≤T≤550° C., under a pressure P of 0.1 Pa≤P≤200 Pa, or 1 Pa≤P≤100 Pa, for a duration t of 1 h≤t≤50 h, or 3 h≤t≤10 h.

In step (c), the heating of the milled mixture obtained in step (b) may be carried out at a temperature T of 450° C.≤T≤550° C., under a pressure P of 1 Pa≤P≤100 Pa, and/or for a duration t of 3 h≤t≤10 h.

The milling step (b) is of importance, notably for increasing the melting temperature of starting materials by generating $Li_3PS_4$. As regards milling techniques, apart from ball milling, vibration milling and jet milling are also possible. The inert gas in step (b) may be, for example, nitrogen or argon. In some embodiments, the inert gas is argon.

In materials according to the present disclosure comprising the elements Li, M, P, S and X, wherein M is Si, Ge and/or Sn, and X is F, Cl, Br and/or I, in some embodiments, M is Si. Also, in some embodiments, X is Br. In still other embodiments, M is Si and X is Br.

Materials according to the present disclosure have a composition represented by the following general formula (1):

$$(1-Y)[Li_{4+(2-\delta)x}MS_4(S_{1-\delta}X_\delta)_x] \cdot Y(PS_{2.5}) \quad (1)$$

wherein
0.5≤x≤2;
0≤δ≤1; and
0<Y≤0.5.

As mentioned above, in some embodiments, M is Si and/or X is Br.

In materials represented by general formula (1) above, x is 0.7≤x≤1.5, or 0.8≤x≤1.3, or 0.9≤x≤1.1, or even substantially equal to 1.0.

Furthermore, in some embodiments, δ is 0.3≤δ≤0.7, or 0.4≤δ≤0.6, or even substantially equal to 0.5.

Furthermore, in some embodiments, Y is 0.05≤Y≤0.35, or 0.10≤Y≤0.25.

It is considered that the ranges for Y, x and δ are substantially independent of the choice of M and X, on account of crystal structure constraints. It may be considered that materials according to the present disclosure and represented by general formula (1) above have a basic structure determined by that of $Li_4MS_4$, for example $Li_4SiS_4$ for M=Si. When part of the sulfur (S) is replaced by halogen (X) and extra $P_2S_5$ is added, a new phase can be obtained. Since this material is crystalline and mostly consists of $MS_4$ (e.g. $SiS_4$) tetrahedra of the mother composition, this constrains the effect of additional X and P and available sites.

The materials according to the present disclosure show, in an X-ray diffraction measurement using a CuKα line, a peak in the positions of 2θ=15.26° (±0.50°), 17.4° (±0.50°), 25.06° (±0.50°), 29.48° (±0.50°), and 30.08° (±0.50°).

In a further aspect, the present disclosure relates to an all-solid-state lithium battery comprising the following elements:
a positive electrode active material layer;
a solid electrolyte;
a negative electrode active material layer,
wherein the solid layer contains a sulfide-type material according to the present disclosure, containing elements Li, M, P, S and X, as defined hereinabove.

In such an all-solid-state lithium battery according to the present disclosure, using as solid electrolyte, the solid sulfide materials of the present disclosure, concerning the form of the solid electrolyte materials, examples include a particle shape, such as the shape of a true ball and the shape of an elliptical ball, or a thin film form, for example. When solid electrolyte materials have a particle shape, the mean particle diameter may be within the range of 50 nm to 10 micrometers, or within the range of 100 nm to 5 micrometers.

In some embodiments the solid electrolyte layer may have only one or more solid electrolyte materials. In some embodiments, this layer may also contain a binding agent if needed. As a binding agent used for a solid electrolyte layer, this may be of the same type as mentioned herein for the positive active material layer.

As regards the thickness of a solid electrolyte layer, although this may change with the kind of solid electrolyte materials, and the overall composition of an all-solid battery, generally this thickness is within the range of 0.1 micrometer to 1000 micrometers, or within the range of 0.1 micrometer to 300 micrometers.

Concerning the positive active material (cathode active material), which can be used in the positive electrode (cathode) active material layer, this is not especially limited if the average operating potential becomes more than 4 V (vs. Li/Li+). As an average operating potential of positive active material, this (average operating potential) is appropriately more than 4 V (vs. Li/Li+), such as within the limits of 4.0 V to 6.0 V, or within the limits of 4.5 V to 5.5 V. The average operating potential can be evaluated using cyclic voltammetry, for example. In particular, when cyclic voltammetry is measured at a small electric potential speed like 0.1 mV/sec, it can be considered that the average value of the voltage which gives the peak current on the side of oxidation, and the voltage which gives the peak current on the side of reduction is the average operating potential.

As a positive active material, especially if the average operating potential is made with more than 4 V (vs. Li/Li$^+$), there is no specific limitation. In some embodiments, the material is an oxide positive active material, which can have a high energy density.

A compound which has the spinel type structure denoted by general formula LiM$_2$O$_4$ (M is at least one kind of transition metal element), as an example of positive active material, can be mentioned as an example. As regards M of the above-mentioned general formula LiM$_2$O$_4$, especially if it is a transition metal element, it will not be limited. In some embodiments, it is at least one kind chosen from the group which consists of Ni, Mn, Cr, Co, V, and Ti, for example. In some embodiments, it is at least one kind chosen from the group which consists of Ni, Mn, and Cr especially. Specifically, LiCr$_{0.05}$Ni$_{0.50}$Mn$_{1.45}$O$_4$, LiCrMnO$_4$, LiNi$_{0.5}$Mn$_{1.5}$O$_4$, etc. can be mentioned. The compound which has the olivine type structure denoted by general formula LiMPO$_4$ (M is at least one kind of transition metal element) as other examples of positive active material can be mentioned. M in the above-mentioned general formula will not be limited especially if it is a transition metal element. In some embodiments, it is at least one kind chosen from Mn, Co, Ni, and the group that consists of V, for example. In some embodiments, it is at least one kind chosen from the group which consists of Mn, Co, and Ni especially. Specifically, LiMnPO$_4$, LiCoPO$_4$, LiNiPO$_4$, etc. can be mentioned. The compound which has the layer structure denoted by general formula LiMO$_2$ (M is at least 1 type of a transition metal element) as other examples of positive active material can be mentioned. Specifically, LiCoO$_2$, LiNi$_{0.5}$Mn$_{0.5}$O$_2$ and LiNi$_{0.33}$Co$_{0.33}$Mn$_{0.33}$O$_2$ etc. can be mentioned. As examples other than the positive active material mentioned above, a Li$_2$MnO$_3$—LiNi$_{1/3}$Co$_{1/3}$Mn$_{1/3}$O$_2$ solid solution, a Li$_2$MnO$_3$—LiNi$_{0.5}$Mn$_{1.5}$O$_2$ solid solution, a Li$_2$MnO$_3$—LiFeO$_2$ solid solution, etc. can be mentioned.

As regards the form of the positive active material, a particle shape, such as the shape of a true ball and the shape of an elliptical ball, thin film form, etc. can be mentioned, as an example. As for the mean particle diameter, when the positive active material has a particle shape, it is within the size range of 0.1 micrometer to 50 micrometers, for example. As for the content of the positive active material in a positive active material layer, it is in the range of 10% by weight to 99% by weight, for example, or from 20% by weight to 90% by weight.

Concerning the positive active material layer, in addition to the positive active material mentioned above, if needed, the positive active material layer may contain other materials, for example, solid electrolyte materials etc. As for the content of the solid electrolyte materials in a positive active material layer, this content is 1% by weight to 90% by weight, or 10% by weight to 80% by weight.

Furthermore, a positive active material layer may contain an electrically conductive agent from a viewpoint of improving the conductivity of a positive active material layer, other than the solid electrolyte materials mentioned above. As electrically conductive material, acetylene black, Ketjen-black, a carbon fiber, etc. can be mentioned, for example. A positive active material may also contain a binding agent. As such a binding material (binding agent), fluorine-based binding materials, such as polyvinylidene fluoride (PVDF) and polytetrafluoroethylene (PTFE), etc. can be mentioned, for example.

Although the thickness of a positive active material layer may change according to the kind of all-solid-state battery made, it is generally within the range of 0.1 micrometer to 1000 micrometers.

As regards the negative electrode active material layer this layer at least contains one or more negative electrode active material(s), and may additionally contain at least one or more of solid electrolyte materials and electrically conductive agents if needed. For all-solid-state lithium batteries, the negative electrode active material is not limited provided that occlusion and discharge of the Li ion, which is a conduction ion, are possible. As a negative electrode active material, a carbon active material, a metal active material, etc. can be mentioned, for example. As a carbon active material, black lead, meso carbon micro beads (MCMB), highly ordered/oriented pyrolytic graphite (HOPG), hard carbon, soft carbon, etc. can be mentioned as examples. On the other hand, as a metal active material, charges of an alloy, such as Li alloy and Sn—Co—C, In, Al, Si, Sn, etc. can be mentioned as examples. Oxide stock materials, such as Li$_4$Ti$_5$O$_{12}$, can be mentioned as examples of other negative electrode active materials.

Concerning solid electrolyte materials used for the negative electrode active material layer, and an electrically conductive agent, these may be the same as that for the solid electrolyte layer and positive active material layer mentioned above.

The thickness of the negative electrode active material layer will generally be appropriately within the range of 0.1 micrometer to 1000 micrometers.

An all-solid-state battery of the present disclosure has at least the positive active material layer, solid electrolyte layer, and negative electrode active material layer which were mentioned above. It further usually has a positive pole collector which collects a positive active material layer, and a negative pole collector which performs current collection of a negative electrode active material layer. As a material of a positive pole collector, for example, SUS (stainless steel), aluminum, nickel, iron, titanium, carbon, etc. can be mentioned. In some embodiments, the positive pole collector can be SUS. On the other hand as a material of a negative pole collector, SUS, copper, nickel, carbon, etc. can be mentioned, for example. In some embodiments, the negative pole collector can be SUS. Concerning the thickness, form, etc. of a positive pole collector and a negative pole collector, the person skilled in the art may choose suitably according to the use of the all-solid-state battery, etc. The cell case used for a common all-solid-state battery can be used as the cell case used for the present disclosure, for example, the cell case made from SUS, etc. can be mentioned. The all-solid-state battery of the present disclosure may form a power generation element in the inside of an insulating ring.

The all-solid-state battery of the present disclosure can be considered as a chargeable and dischargeable all-solid-state battery in a room temperature environment. The all-solid-state battery may be a primary battery and may be a rechargeable battery as an all-solid-state battery of the present disclosure. In some embodiments, the all-solid-state battery is a rechargeable battery. Concerning the form of the all-solid-state battery, a coin type, a laminated type, cylindrical, a square shape, etc. can be mentioned, as examples.

As regards the manufacturing method of the all-solid-state battery of the present disclosure, this is not particularly limited, and common manufacturing methods of all-solid-state batteries can be used. For example, when an all-solid-state battery is in the thin film form, a positive active material layer can be formed on a substrate, and the method of forming a solid electrolyte layer and a negative electrode active material layer in order, and laminating them thereafter etc., may be used.

Within the practice of the present disclosure, it may be envisaged to combine any features or embodiments which have hereinabove been separately set out and indicated to be appropriate or otherwise applicable in the practice of the disclosure. The present description should be considered to include all such combinations of features or embodiments described herein unless such combinations are said herein to be mutually exclusive or are clearly understood in context to be mutually exclusive.

EXPERIMENTAL SECTION—EXAMPLES

The following experimental section illustrates experimentally the practice of the present disclosure, but the scope of the present disclosure is not to be considered to be limited to the specific examples that follow.

The solid electrolytes of $(1-Y)[Li_{4+(2-\delta)x}MS_4(S_{1-\delta}X_\delta)_x] \cdot Y(PS_{2.5})$ were synthesized and their conductivity was tested, wherein M=Si, X=Br, x=1 and δ=0.5 for the following Examples.

Synthesis of Solid Electrolytes

Example 1

The solid electrolyte of 0.85 $(Li_{5.5}SiS_{4.5}Br_{0.5}) \cdot 0.15$ $(PS_{2.5})$ [Y=0.15] was synthesized using starting materials $Li_2S$ (Nihon Chemical Industry), $SiS_2$ (Alfa Aesar), LiBr (Kojundo Chemical Lab.) and $P_2S_5$(Aldrich). They were mixed at the weight ratio (listed in Table 1) and put into the zirconium pot (45 mL) with 10 zirconium balls (φ10 mm) under argon. The pot was closed and treated with planetary milling equipment (Fritsch, P7) at 370 rpm for 40 h to obtain the precursor. The precursor was sealed into the glass tube at the pressure of 30 Pa and then heated at 500° C. for 8 h.

Examples 2 to 4 and Comparative Example 1

The same procedures were performed as given above in Example 1 except for the weight ratio of starting materials listed hereunder as Table 1.

TABLE 1

| | Weight ratio of starting materials | | | | |
|---|---|---|---|---|---|
| | Example 1 | Example 2 | Example 3 | Example 4 | Comparative Example 1 |
| Y | 0.15 | 0.20 | 0.25 | 0.10 | 0 |
| $Li_2S$ | 0.425 | 0.413 | 0.399 | 0.437 | 0.459 |
| $P_2S_5$ | 0.073 | 0.100 | 0.129 | 0.047 | 0 |
| $SiS_2$ | 0.341 | 0.331 | 0.321 | 0.351 | 0.368 |
| LiBr | 0.161 | 0.156 | 0.151 | 0.165 | 0.173 |

Measurement of Li Ion Conductance

Li ion conductance at a temperature of 25° C. was measured while using the sulfide solid electrolyte material obtained in Examples 1 to 4 and Comparative Example 1. First, 100 mg of the sulfide solid electrolyte material was added to a cylinder made of macole and pressed at 4 ton/cm² to form a solid electrolyte layer. The pellet was sandwiched by SUS current collector for measuring impedance spectroscopy.

An impedance gain-phase analyzer manufactured by Biologic (VMP3) was used for the measurement as FRA (Frequency Response Analyzer). The measurement was started from a high-frequency range using conditions of an alternating voltage of 5 mV, a frequency range of 1 Hz to 1 MHz. The ionic conductivity of each of the materials are shown in FIG. 1.

X-Ray Diffraction Measurement.

Figure 2:
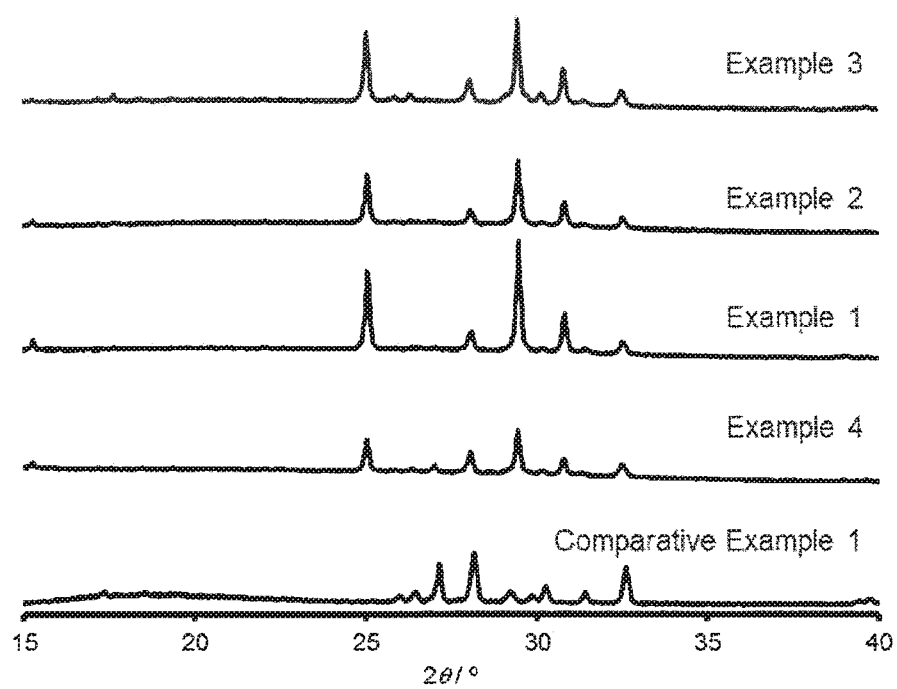
FIG. 2 shows X-ray diffraction (XRD) measurements of sulfide solid electrolyte materials prepared in the Examples and Comparative Example.

X-ray diffraction measurement (using a CuKα line) was performed by using the sulfide solid electrolyte materials obtained in Examples 1 to 4 and the comparative samples obtained in Comparative Example 1. The results are shown in FIG. 2.

A peak in positions of 2θ=15.26° (±0.50°), 17.4° (±0.50°), 25.06θ (±0.50°), 29.48° (±0.50°), and 30.08° (±0.50°) in an X-ray diffraction measurement using a CuKα line was observed for Examples 1 to 4. In the case of Comparative Example 1, the target crystal was not obtained.

The X-ray diffraction measurement was carried out under the following measuring conditions:
Wavelength of X-ray: 1.5418 Å (CuKα line)
Temperature: 25° C.
Machine: Rigaku Ultima III
Detector: D/teX Ultra
Step: 0.01°
IS: ⅓
RS1: 8 mm
RS2: 13 mm
Tube voltage: 45 kV
Tube current: 200 mA It is considered that as long as the CuKα beam is used, the same Bragg peaks will be observed even if exact machine and measuring conditions are varied.

The invention claimed is:

1. A material comprising the elements Li, M, P, S and X, wherein M is at least one element selected from the group consisting of: Si, Ge, and Sn; and
X is at least one halogen element selected from the group consisting of F, Cl, Br and I,
wherein the material has a composition represented by the following general formula (1):

$$(1-Y)[Li_{4+(2-\delta)x}MS_4(S_{1-\delta}X_\delta)_x] \cdot Y(PS_{2.5}) \quad (1)$$

wherein:
0.5≤x≤2;
0≤δ≤1; and
0.05≤Y≤0.35.

2. The material according to claim 1, wherein M is Si.
3. The material according to claim 1, wherein X is Br.
4. The material according to claim 1, wherein 0.7≤x≤1.5.
5. The material according to claim 1, wherein 0.3≤δ≤0.7.
6. The material according to claim 1,
wherein, in an X-ray diffraction measurement of the material using a CuKα line, the material shows a peak in the positions of 2θ=15.26° (±0.50°), 17.4° (±0.50°), 25.06° (±0.50°), 29.48° (±0.50°), and 30.08° (±0.50°).

7. A process for preparing the material according to claim 1, comprising the steps of:
(a) providing solid sulfides $Li_2S$, $MS_2$ (M=Si, Ge or Sn) and $P_2S_5$, as well as LiX (X=F, Cl, Br, I) as dry powders, in the stoichiometric proportions corresponding to the target product, and mixing the powders;
(b) milling the mixture obtained in step (a) under an inert atmosphere; and
(c) heating the milled mixture obtained in step (b) at a temperature T of 300° C.≤T≤700° C., under a pressure P of 0.1 Pa≤P≤200 Pa, for a duration t of 1 h≤t≤50 h.

8. An all-solid-state lithium battery comprising the following elements:

a positive electrode active material layer;
a solid electrolyte; and
a negative electrode active material layer,
wherein the solid electrolyte contains the material according to claim 1.

9. The material according to claim 1, wherein 0.8≤x≤1.3.

10. The material according to claim 1, wherein 0.9≤x≤1.1.

11. The material according to claim 1, wherein x is substantially equal to 1.0.

12. The material according to claim 1, wherein 0.4≤δ≤0.6.

13. The material according to claim 1, wherein δ is substantially equal to 0.5.

14. The material according to claim 1, wherein 0.10≤Y≤0.25.

15. A material comprising the elements Li, M, P, S and X, wherein
M is at least one element selected from the group consisting of: Si, Ge, and Sn;
X is Br; and
the material has a composition represented by the following general formula (1):

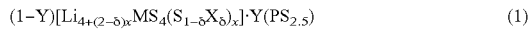

$(1-Y)[Li_{4+(2-\delta)x}MS_4(S_{1-\delta}X_\delta)_x] \cdot Y(PS_{2.5})$  (1)

wherein:
0.5≤x≤2;
0.3≤δ≤0.7; and
0<Y≤0.5.

16. The material according to claim 15, wherein M is Si.

17. The material according to claim 15, wherein 0.7≤x≤1.5.

18. The material according to claim 15, wherein, in an X-ray diffraction measurement of the material using a CuKα line, the material shows a peak in the positions of 2θ=15.26° (±0.50°), 17.4° (±0.50°), 25.06° (±0.50°), 29.48° (±0.50°), and 30.08° (±0.50°).

19. A process for preparing the material according to claim 15, comprising the steps of:
(a) providing solid sulfides $Li_2S$, $MS_2$ (M=Si, Ge or Sn) and $P_2S_5$, as well as LiBr as dry powders, in the stoichiometric proportions corresponding to the target product, and mixing the powders;
(b) milling the mixture obtained in step (a) under an inert atmosphere; and
(c) heating the milled mixture obtained in step (b) at a temperature T of 300° C.≤T≤700° C., under a pressure P of 0.1 Pa≤P≤200 Pa, for a duration t of 1 h≤t≤50 h.

20. An all-solid-state lithium battery comprising the following elements:
a positive electrode active material layer;
a solid electrolyte; and
a negative electrode active material layer,
wherein the solid electrolyte contains the material according to claim 15.

* * * * *

UNITED STATES PATENT AND TRADEMARK OFFICE
CERTIFICATE OF CORRECTION

PATENT NO. : 10,879,558 B2  
APPLICATION NO. : 16/060176  
DATED : December 29, 2020  
INVENTOR(S) : Yuki Katoh Page 1 of 1

It is certified that error appears in the above-identified patent and that said Letters Patent is hereby corrected as shown below:

In the Specification

In Column 6, Line(s) 5, after "layer", insert --,--.

In Column 8, Line(s) 13, delete "25.060" and insert --25.06°--, therefor.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*